UNITED STATES PATENT OFFICE.

JOSEPH BARTON SCAMMELL, OF LONDON, ENGLAND, ASSIGNOR TO RUBBER SUBSTITUTE (1910) LIMITED, OF LONDON, ENGLAND.

SUBSTITUTE FOR RUBBER.

1,073,527.  Specification of Letters Patent.  Patented Sept. 16, 1913.

No Drawing.  Application filed April 7, 1911.  Serial No. 619,572.

*To all whom it may concern:*

Be it known that I, JOSEPH BARTON SCAMMELL, subject of the King of England, residing in London, England, have invented certain new and useful Improvements in Substitutes for Rubber, of which the following is a specification.

This invention relates to improvements in the production of a plastic, elastic and tough material suitable for use as a substitute for india rubber, gutta percha, or the like or for admixture with these substances to reduce the cost of their manufacture. There have been many attempts to make substances which would mix well with real india rubber and reduce its cost but generally these bodies were simply adulterants, that is having no tensile strength of their own they simply added bulk to the rubber and correspondingly reduced its strength.

The compound prepared according to this invention has considerable strength of its own and mixes well with india rubber: further, it has no deleterious effect on rubber but on the contrary it prevents decay caused by oxidation.

Previously (see U. S. Patent No. 724,618) it has been proposed to produce artificial rubber by dissolving cellulose in an oil, with the aid of chlorid of sulfur dissolved in a suitable solvent which is added slowly to the oil, and thereafter the addition of a suitable drying agent to the mixture.

According to this invention a method of producing a substitute for rubber consists in first soaking cellulose such as cotton in a fatty acid as butyric acid and thereafter adding the cotton to a vegetable or animal oil introducing chlorid of sulfur so that the cellulose is dissolved, and neutralizing the acids formed.

In the methods of producing artificial india rubber by mixing oil with cellulose and chlorid of sulfur a feature of this invention consists in adding to the oil a gum resin which dissolves therein at comparatively low temperatures, such as gum elemi for the purpose of toughening the compound.

The following is an example of one method of carying this invention into effect: Cotton or other suitable form of cellulose is soaked in butyric acid; it is then removed from the acid when the surplus liquid is dried off. To the oil to be used, say cottonseed oil, is added from 1% to 5% of gum elemi which is dissolved in the oil by moderate heating. The prepared cotton is then introduced into the oil also in the proportion of say 1% to 5% of cotton. A quantity of chlorid of sulfur amounting to about 20% of the oil is dissolved in any suitable solvent such as paraffin oil. A proportion of the solution of sulfur chlorid, (say one-third of it) is now added to the mixture above described and in the course of a few hours (say 8–12 hours) the cotton dissolves. At this stage preferably a proportion of oxid or carbonate of calcium or magnesium is added for the purpose of neutralizing any acid formed whereupon the remainder of the sulfur chlorid solution is introduced. In about an hour's time thereafter the whole mixture becomes a perfectly homogeneous solid and advantage can be taken of this period of time to fill motor or cycle tires with the compound, to make the cores of golf balls or to cast the material in molds to any desired shape.

It is found that when the material above described is being allowed to set, it is advantageous to expose it to the air in a comparatively thin layer say one or two inches thick and in practice therefore the material before setting is poured out on to flat trays or floors so as to form a layer one or two inches thick. If the material is allowed to solidify in a large mass it is apt to overheat and it does not set into a homogeneous material.

The preferred method of incorporating the hereinbefore described substitute for india rubber with real rubber or gutta percha is as follows:—The rubber substitute if it has set and cooled is put through a shredding, granulating or cutting machine to reduce it into the form of worms, granules or the like which may conveniently be exposed to the air for some days. The material in this state is mixed with the raw rubber by any of the methods for making rubber dough. Thus, the material may be introduced between sheets of real rubber and rapidly rolled into it in the well known manner prior to vulcanization.

The substitute for rubber above described when used by itself without any real rubber or gutta-percha will be chiefly employed for filling tires or for similar uses in which the resiliency of the material is required without great tensile strength.

The details of the method described and the proportions of the ingredients may be varied without departing from this invention.

What I claim as my invention and desire to secure by Letters Patent is:—

1. The herein described method of producing a substitute for rubber which consists in soaking cellulose in a fatty acid, removing excess of the acid, adding the cellulose to an oil vulcanizable by sulfur chlorid, introducing chlorid of sulfur so that the cellulose is dissolved, and neutralizing the acids formed.

2. The herein described method of producing a substitute for rubber which consists in soaking cotton in a fatty acid, removing excess of the acid, adding the cotton to an oil vulcanizable by sulfur chlorid, introducing chlorid of sulfur so that the cotton is dissolved, and neutralizing the acids formed.

3. The herein described method of producing a substitute for rubber which consists in soaking cotton in butyric acid, removing excess of the acid, adding the cotton to an oil vulcanizable by sulfur chlorid, introducing chlorid of sulfur so that the cotton is dissolved, and neutralizing the acids formed.

4. The herein described method of producing a substitute for rubber which consists in soaking cotton in butyric acid, removing excess of butyric acid, adding the cotton to an oil vulcanizable by sulfur chlorid, introducing chlorid of sulfur so that the cotton is dissolved, neutralizing the acids formed, and adding a further quantity of chlorid of sulfur to cause the mixture to solidify.

5. The herein described method of producing a substitute for rubber which consists in soaking cellulose in a fatty acid, removing excess of the acid, adding the cellulose to an oil vulcanizable by sulfur chlorid containing a gum resin, the said gum resin being dissolved in the oil at comparatively low temperatures, introducing chlorid of sulfur so that the cellulose is dissolved, and neutralizing the acids formed.

6. The herein described method of producing a substitute for rubber which consists in soaking cotton in butyric acid removing excess of acid, adding the cotton to an oil vulcanizable by sulfur chlorid containing gum elemi, introducing chlorid of sulfur so that the cotton is dissolved, and neutralizing the acids formed.

7. The herein described method of producing a substitute for rubber which consists in soaking cotton in butyric acid, removing excess of the acid, adding the cotton to cotton seed oil containing gum elemi in solution, introducing chlorid of sulfur mixed with paraffin oil so that the cotton is dissolved, neutralizing the acids formed by the addition of calcium carbonate, and causing the mixture to solidify by the addition of a further quantity of chlorid of sulfur mixed with paraffin oil.

In testimony whereof I have signed my name to this specification in the presence of two subscribing witnesses.

JOSEPH BARTON SCAMMELL.

Witnesses:
R. WESTACOTT,
T. PERCIVAL WEST.